Patented July 5, 1927.

1,635,055

UNITED STATES PATENT OFFICE.

ALADAR PACZ, OF CLEVELAND, OHIO, ASSIGNOR TO GENERAL ELECTRIC COMPANY, A CORPORATION OF NEW YORK.

ALLOY FILAMENT.

No Drawing.    Application filed January 15, 1920. Serial No. 351,665.

My invention relates to the production of combinations of tungsten with another metal for use especially as filaments in electric incandescent lamps. I have found that combinations of tungsten with zirconium may be produced and that such metals may be worked into filaments having the qualities of long life and high efficiency. I have found that such combinations, which are probably alloys, do not require the addition of non-metallic crystallization retarding materials which have been heretofore used to a great extent to prevent shortening of the life of the filament due to offsetting. According to my theory, the results which I secure are due to the bringing together of the tungsten and zirconium in a very pure condition and while it may be true that the action of the zirconium is to prevent offsetting, it is probably true that a true alloy is formed which does not require any additional offsetting preventing material—in other words, the zirconium may be considered as a substitute for the thoria or other non-metallic material which has been heretofore used to prevent offsetting or my invention may be considered to reside in the use of a new metal for filament purposes which does not require the use of an offsetting preventing material.

I will now describe one specific example of the mode of producing a filament embodying my invention. 50 grams of zirconium dioxide is mixed very thoroughly with finely divided magnesium powder. This mixture is then placed in an iron boat and heated up in a hydrogen atmosphere to a dull red heat, say 500 to 600 degrees centigrade, at which temperature a reaction takes place between the magnesium and zirconium dioxide, resulting in the formation of magnesium oxide and a mixture of metallic zirconium, hydride of zirconium and unreduced oxides of zirconium. The resulting black mass is pulverized very thoroughly, passed through a very fine sieve and digested several times with diluted hydrochloric acid until the filtrate shows no magnesium solids present. In other words, the digesting process is continued until the residue consists only of metallic zirconium, zirconium hydride, and some of the unreduced oxides of zirconium. The next step is to filter off the liquid and wash the residue with alcohol and ether. This method of obtaining zirconium has been practiced heretofore.

I next mix a quantity of finely divided tungsten metal, preferably having intimately mixed therewith a certain percentage of silica, with the pulverized residue above described so that the said residue, which consists of zirconium and zirconium compounds, constitutes 1 to 2% of the whole. In my application Serial No. 149,915, filed February 20, 1917, Patent No. 1,410,499, March 21, 1922, I have described a method of preparing finely divided tungsten and having intimately mixed therewith a small percentage of silica and other ingredients, and it is this mixture which I prefer to mix with the zirconium and zirconium compounds. This mixture may be performed mechanically. The resultant mixture is then compressed, sintered and worked mechanically in the regular way as described in the Coolidge Patent No. 1,082,933.

It will be obvious that instead of mixing the pulverized zirconium and zirconium compounds with the metallic tungsten as above described, this mixture may be made with tungstic oxide—the whole mixture being then subjected to treatment by hydrogen. This is merely another way of arriving at a combination of the tungsten with the zirconium.

Another method of obtaining the combination of the tungsten with the zirconium is to mix together the pure tungstic oxide, zirconium dioxide and finely powdered metallic magnesium. These materials are very intimately mixed mechanically, although the mixture of the tungstic oxide and the zirconium oxide can be arrived at chemically. For instance, a paste may be made of the tungstic oxide with a zirconium nitrate solution and by heating this to a high temperature the zirconium nitrate will be decomposed into zirconium oxide which will be very intimately incorporated with the tungstic acid. This mixture may then be thoroughly mixed with the magnesium. Another method would be to precipitate together tungstic acid with zirconium oxalate and then to ignite decomposing the oxalate and leaving the intimately combined oxides. In all of these modifications the final step before compressing should be to mix in a quantity of the tungstic acid mixed with silica or other non-metallic material as produced according to my application above referred to. The whole mixture should then be subjected to treatment by hydrogen and pressed and sintered. I regard it as being highly desirable to have incorporated in the material which is sintered the added non-metallic material as disclosed in my application above referred to. The function of this is to slag off not only all non-metallic constituents, including the oxides of tungsten, but also the oxides of zirconium.

In the case of the combination of tungsten and zirconium, as above referred to, the percentage of zirconium in one instance which produced good results was approximately 1%. Good results may also be obtained with less than 1% of zirconium—higher percentages are more difficult to work but still may be useful for purposes other than filaments. The 1% zirconium combination was harder to work than the ordinary tungsten and the wire was more springy. It was found that upon testing the 100 mil size the tendency to crystallize was materially reduced as compared to ordinary tungsten. This was done by heating almost to the melting point and holding in the boat 8 minutes and then examining the fracture. Two 40 watt lamps containing this wire were tested and showed longer life before burn-out, having the same efficiency as the regular tungsten wire.

What I claim and desire to secure by Letters Patent of the United States is:—

1. A filament for incandescent lamps consisting of tungsten with less than 1% of zirconium.

2. The process of producing metal filaments which consists in combining tungsten with a product derived from the reduction with magnesium of a zirconium compound and then mechanically working the metal thus produced to filament form.

3. The process of producing metal filaments which consists in combining tungsten with the product obtained by reducing with magnesium zirconium oxide and afterwards mechanically working the said metal down to filamentary form.

4. The process of producing metal filaments which consists in mixing a tungsten compound, a zirconium compound and magnesium, reducing the said mixture to metal and then working the said metal down to filamentary form.

5. The process of producing metal filaments which consists in mixing tungsten oxide, zirconium oxide, finely divided magnesium and silica, reducing the said mixture to metal and then working the said metal down to filamentary form.

6. The process of producing metal filaments which consists in mixing a tungsten compound, a zirconium compound, and a reducing agent, reducing the said mixture to metal, and then working the metal down to filamentary form.

7. The process of producing metal filaments which consists in mixing a tungsten compound, a zirconium oxide, and a reducing agent, reducing the said mixture to metal, and then working the said metal down to filamentary form.

8. The process of producing metal filaments which consists in mixing tungsten oxide, zirconium oxide, a reducing agent, and silica, reducing the said mixture to metal, and then working the said metal down to filamentary form.

In witness whereof I have hereunto set my hand this 26th day of December, 1919.

ALADAR PACZ.